(12) United States Patent
Pisut, IV et al.

(10) Patent No.: US 10,997,650 B2
(45) Date of Patent: May 4, 2021

(54) CONVERSATION AS A PLATFORM TO INCREASE TASK PRODUCTIVITY FOR END USERS

(71) Applicant: Microsoft Technology Licensing, LLC, Redmond, WA (US)

(72) Inventors: Matthias Bernard Pisut, IV, Issaquah, WA (US); Malcolm Erik Pearson, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 420 days.

(21) Appl. No.: 15/799,287

(22) Filed: Oct. 31, 2017

(65) Prior Publication Data
US 2019/0130475 A1    May 2, 2019

(51) Int. Cl.
*G06Q 30/06* (2012.01)
*H04L 12/58* (2006.01)
(Continued)

(52) U.S. Cl.
CPC ........... *G06Q 30/0641* (2013.01); *G06N 5/02* (2013.01); *G06Q 20/12* (2013.01); *G06Q 20/202* (2013.01);
(Continued)

(58) Field of Classification Search
CPC .. G06Q 30/0641; G06Q 20/12; G06Q 20/202; G06Q 20/322; G06Q 20/36;
(Continued)

(56) References Cited

U.S. PATENT DOCUMENTS

| 5,778,178 A | 7/1998 | Arunachalam |
| 5,920,848 A | 7/1999 | Schutzer et al. |

(Continued)

FOREIGN PATENT DOCUMENTS

| WO | 2002003286 A1 | 1/2002 |
| WO | 2012167202 A2 | 12/2012 |

(Continued)

OTHER PUBLICATIONS

Etlinger, Susan, "The Conversational Business: How Chatbots Will Reshape Digital Experiences", Retrieved From: https://andyblackassociates.co.uk/wp-content/uploads/2015/06/ConversationalBusiness_FINAL-1.pdf, Jun. 27, 2017, 30 Pages.

(Continued)

*Primary Examiner* — Peter Ludwig
*Assistant Examiner* — Michael Jared Walker
(74) *Attorney, Agent, or Firm* — Mark K. Young; Mayer & Williams, PC

(57) ABSTRACT

Conversations between an intelligent, machine-based chat bot and a user of a website or an application support a computing paradigm called Conversation as a Platform (CaaP) to dynamically generate payment agreements that enable asynchronous actions to be performed for e-commerce transactions which the user may use to confirm the transaction, change the terms (e.g., payment method, ship-to address, shipping method, etc.), or cancel the transaction. Upon opt-in by the user to the payment agreement, a cloud-based wallet provider gives a payment credential URL (Uniform Resource Locator) to the chat bot provider that is called to receive an actual payment credential, and which may also be used for subsequent transactions.

18 Claims, 15 Drawing Sheets

(51) Int. Cl.
*G06Q 20/36* (2012.01)
*G06N 5/02* (2006.01)
*G06Q 20/20* (2012.01)
*G06Q 20/12* (2012.01)
*G06Q 20/32* (2012.01)

(52) U.S. Cl.
CPC .......... *G06Q 20/322* (2013.01); *G06Q 20/36* (2013.01); *H04L 51/02* (2013.01); *G06Q 20/327* (2013.01); *H04L 51/046* (2013.01)

(58) Field of Classification Search
CPC ........ G06Q 20/327; G06N 5/02; H04L 51/02; H04L 51/046
See application file for complete search history.

(56) References Cited

U.S. PATENT DOCUMENTS

| | | |
|---|---|---|
| 7,418,421 B2 | 8/2008 | Fitzpatrick et al. |
| 7,861,252 B2 | 12/2010 | Uszok et al. |
| 8,958,772 B2 | 2/2015 | Kim et al. |
| 9,202,211 B2 | 12/2015 | Davis et al. |
| 9,235,839 B2 | 1/2016 | Dua |
| 9,311,675 B2 | 4/2016 | Labuszewski et al. |
| 9,830,580 B2 * | 11/2017 | MacGregor ............ G06Q 20/10 |
| 2007/0011104 A1 | 1/2007 | Leger et al. |
| 2008/0086759 A1 | 4/2008 | Colson |
| 2012/0030301 A1 * | 2/2012 | Herold ................ H04L 12/1818 709/206 |
| 2012/0158584 A1 * | 6/2012 | Behren ................ G06Q 20/209 705/41 |
| 2012/0310826 A1 * | 12/2012 | Chatterjee ............ G06Q 20/322 705/41 |
| 2013/0073366 A1 * | 3/2013 | Heath ................ G06Q 30/0259 705/14.25 |
| 2013/0073388 A1 * | 3/2013 | Heath ................ G06Q 30/02 705/14.53 |
| 2013/0159170 A1 | 6/2013 | Gandhi et al. |
| 2013/0346302 A1 * | 12/2013 | Purves ................ G06Q 20/108 705/40 |
| 2015/0371173 A1 | 12/2015 | Jalali |
| 2016/0044380 A1 * | 2/2016 | Barrett ................ H04N 21/812 725/53 |
| 2016/0104132 A1 * | 4/2016 | Abbatiello ........... G06Q 20/386 705/39 |
| 2016/0104133 A1 * | 4/2016 | Davis ................ G06Q 50/01 705/39 |
| 2016/0104159 A1 * | 4/2016 | Butterfield ........... G06Q 20/384 705/44 |
| 2016/0307258 A1 * | 10/2016 | May ................ G06Q 30/0635 |
| 2016/0328667 A1 * | 11/2016 | Macciola ................ G06Q 10/10 |
| 2016/0335532 A1 * | 11/2016 | Sanghavi ................ H04L 51/02 |
| 2017/0149703 A1 * | 5/2017 | Willett ................ H04L 51/24 |
| 2017/0221072 A1 * | 8/2017 | AthulurutTlrumala ................ G06F 3/0482 |
| 2017/0256001 A1 * | 9/2017 | Isaacson ................ G06Q 20/12 |

FOREIGN PATENT DOCUMENTS

| | | | |
|---|---|---|---|
| WO | 2013155619 A1 | 10/2013 | |
| WO | WO-2013155619 A1 * | 10/2013 | ........... G06F 40/295 |

OTHER PUBLICATIONS

"International Search Report and Written Opinion Issued in PCT Application No. PCT/US2018/056817", dated Jan. 8, 2019, 13 Pages.

Piyush, et al., "Conversational Commerce a New Era of E-Business", In Proceedings of Fifth International Conference on System Modeling & Advancement in Research Trends, Nov. 25, 2016, pp. 322-327.

Kashyap, Sindhu, "MagicX joins the Facebook Messenger chatbot fray. Will it be able to create an impact?", Published on: Apr. 16, 2016 Available at: http://yourstory.com/2016/04/magicx-facebook-messenger-chatbot/ (3 pages total).

* cited by examiner

US 10,997,650 B2

CONVERSATION AS A PLATFORM TO INCREASE TASK PRODUCTIVITY FOR END USERS

BACKGROUND

Artificial intelligence techniques have enabled computer programs commonly called "chat bots" (i.e., chat robots) to conduct intelligent conversations with human end users, for example, to provide information and answer queries. Chat bots can typically interact using text- or voice-based interfaces with the users.

SUMMARY

Conversations between an intelligent, machine-based chat bot and a user of a website or an application support a computing paradigm called Conversation as a Platform (CaaP) to dynamically generate payment agreements that enable asynchronous actions to be performed for e-commerce transactions which the user may use to confirm the transaction, change the terms (e.g., payment method, ship-to address, shipping method, etc.), or cancel the transaction. Upon opt-in by the user to the payment agreement, a cloud-based wallet provider gives a payment credential URL (Uniform Resource Locator) to the chat bot provider that is called to receive an actual payment credential, and which may also be used for subsequent transactions.

Using CaaP increases security for a user's computing devices and reduces opportunities for the user's sensitive information stored thereon to be improperly disclosed during e-commerce. Device security is further enhanced by giving the user explicit control over financial resources through a known and trusted wallet provider across a range of different e-commerce interactions. The user's interactions with e-commerce and other resources are also provided increased efficiency by reducing errors associated with manual data entry.

The wallet provider exposes a consistent user interface (UI) and process flow to users to simplify making and managing interactions and transactions with secure and predictable outcomes, using any device, across a universe of chat bots with e-commerce applications, websites, and point-of-sale (POS) systems. The user can securely conduct e-commerce within a streamlined conversation with a chat bot to save time and effort and increase productivity. The available asynchronous actions operate as a comprehensive toolset for the user to flexibly manage after-sale issues and tasks such as confirming a transaction, changing its terms, and canceling.

CaaP provides benefits to chat bot providers by making it easier for existing and new customers and users to securely engage in e-commerce. CaaP streamlines interactions by reducing the multiple steps of configuration, confirmation, and authentication that are typically needed using conventional solutions to complete tasks involving the movement of money. Current mechanisms typically necessitate the user to navigate through an order summary, numerous user-configurable options for payments and shipping and, in some cases, user authentication. CaaP enables users to seamlessly and securely complete e-commerce tasks within the context of a conversation with comprehensive and explicit control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
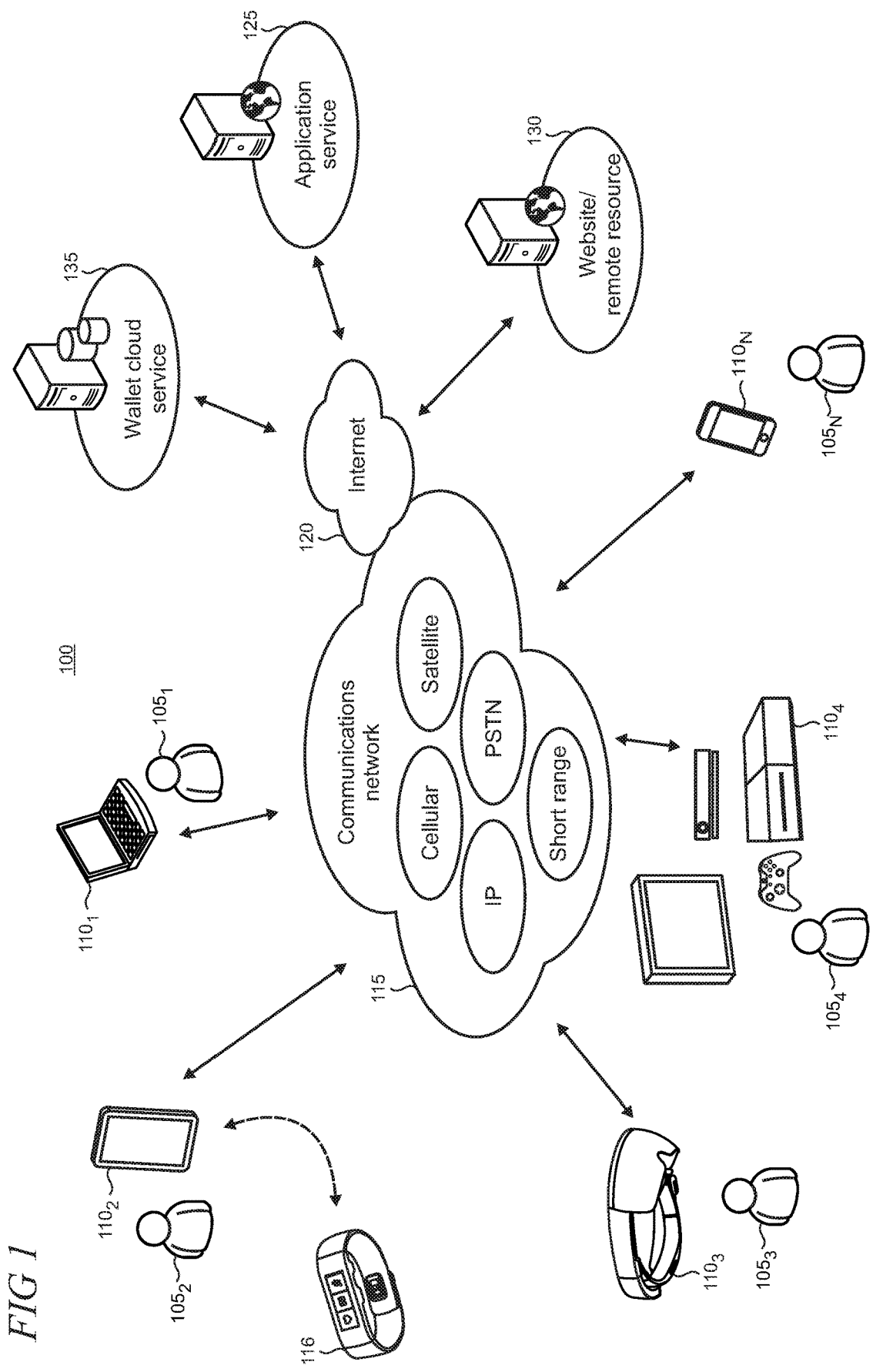
FIG. 1 shows an illustrative environment in which computing devices can communicate and interact with application services and websites over a network.

FIG. 1 shows an illustrative computing environment 100 in which the same or different users 105 may employ computing devices 110 that can communicate with other devices and various services over a network 115. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), desktop computers, multimedia consoles, gaming systems, or the like. In the discussion that follows, the use of the term "device" is intended to cover all computing devices that are configured with communication capabilities and are capable of connectivity to the network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

The devices 110 can typically utilize the network 115 to access and/or implement various user experiences. The network can include any of a variety of network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks. The network infrastructure can be supported, for example, by mobile operators, enterprises, Internet service providers (ISPs), telephone service providers, data service providers, and the like.

The network 115 may utilize portions of the Internet 120 or include interfaces that support a connection to the Internet so that the devices 110 can access content and render user experiences provided by various remote or cloud-based application services 125 and websites 130. The application services 125 and websites 130 can support a diversity of features, services, and user experiences such as social networking, mapping, news and information, entertainment, travel, productivity, finance, electronic commerce (e-commerce) etc. The application services and websites are collectively referred to as application services in the description that follows. A wallet cloud service 135 is also present in the computing environment 100, as shown, and is described in more detail in the text accompanying FIG. 2.

Accessory devices 116, such as wristbands and other wearable computing devices may also be present in the environment 100. Such accessory device 116 typically is adapted to interoperate with a coupled device 110 using a short-range communication protocol like Bluetooth to support functions such as monitoring of the wearer's physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

The devices 110 can typically utilize the network 115 to access and/or implement various user experiences. The network can include any of a variety of network types and network infrastructure in various combinations or sub-combinations including cellular networks, satellite networks, IP (Internet-Protocol) networks such as Wi-Fi under IEEE 802.11 and Ethernet networks under IEEE 802.3, a public switched telephone network (PSTN), and/or short-range networks such as Bluetooth® networks. The network infrastructure can be supported, for example, by mobile operators, enterprises, Internet service providers (ISPs), telephone service providers, data service providers, and the like.

Figure 2:
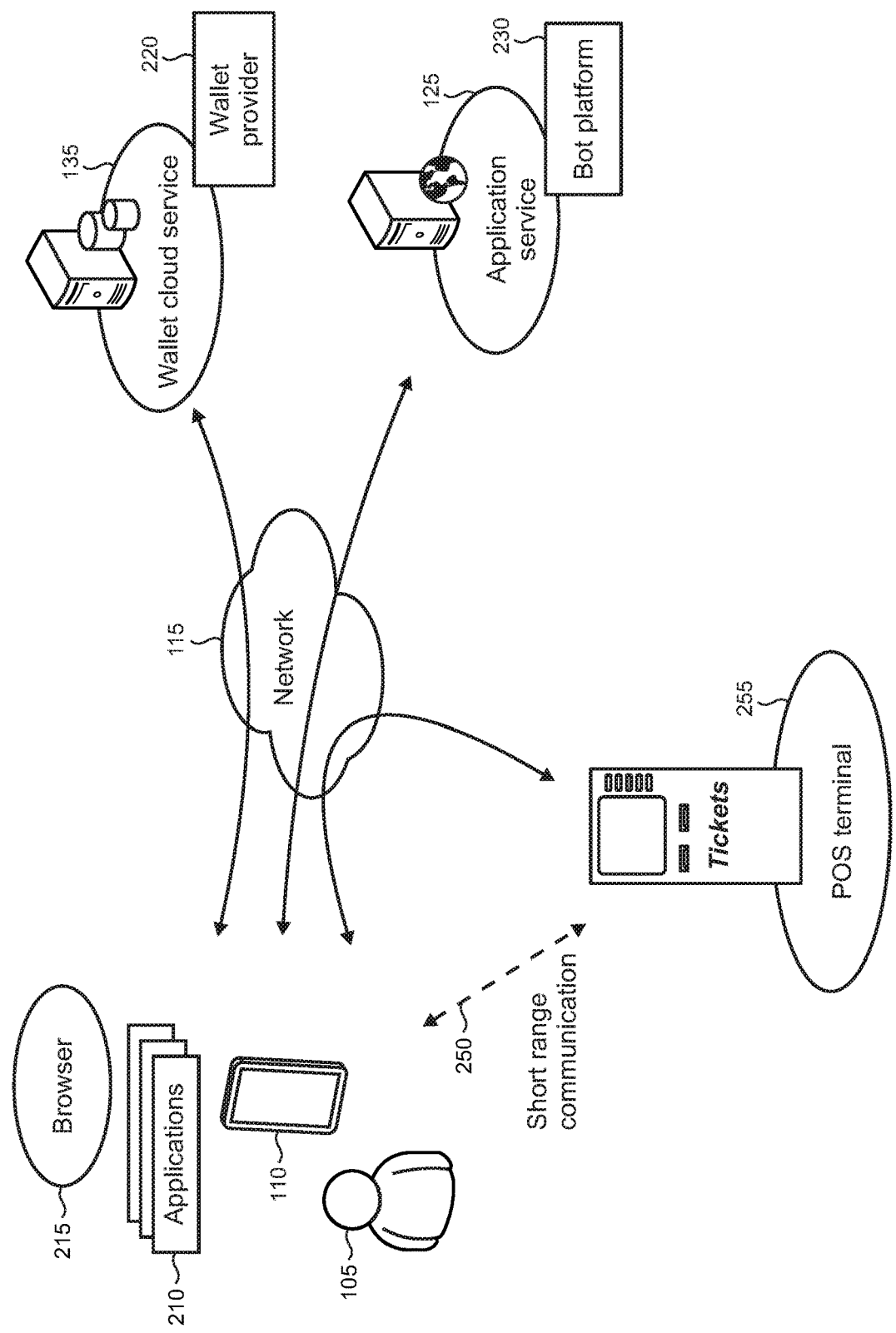
FIG. 2 shows illustrative interactions between a user's device and a cloud-based wallet and bot platform.

As shown in FIG. 2, a device 110 can include local components such as one or more applications 210 and/or a web browser 215 that can respectively facilitate interaction with one or more websites 130 (FIG. 1) and remote application services 125. For example, in some use scenarios, a user 105 may launch a locally executing application that communicates over the network 115 to an application service 125 to retrieve data and obtain services to enable various features and functions, provide information, enable e-commerce and other transactions, and/or support user experiences that can be supported on various ones of the user interfaces on a local device 110 such as graphical user interfaces (GUIs), natural language interfaces, and audio interfaces. In some use scenarios and/or at different times, an application 210 may operate locally on the device without needing to interface with a remote service. In this illustrative example, the wallet cloud service 135 supports a wallet provider 220 that may be configured to provide personalized services to the user 105. The application service 125 supports a bot platform 230 as described in more detail in the text accompanying FIG. 3 below.

The device 110 can be configured to interact over the network 115 and/or over a short-range communication link 250 with point of sale (POS) terminals 255 that may be located at kiosks, self-service checkouts, and other locations that are typically found at high foot traffic settings such as shops, hotel lobbies, and airports. The POS terminal is generally configured to support interactive experiences with customers to facilitate an exchange of information, services, and merchandise. The POS terminal may be customized to meet specific needs and can be utilized, for example, to vend products and services to the user 105.

Figure 3:
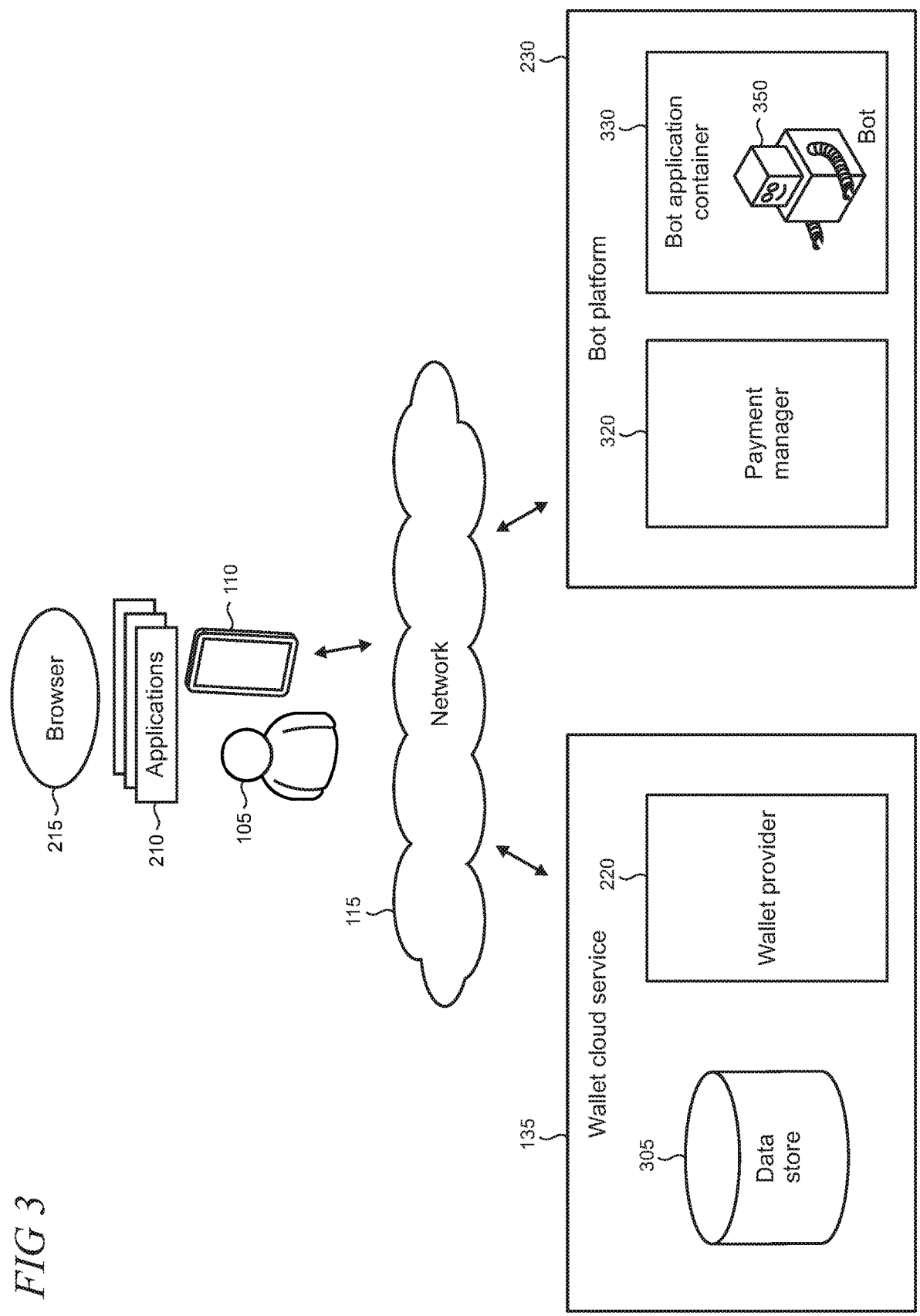
FIG. 3 shows respective illustrative functional components of the wallet and bot platform that support payment and associated asynchronous activities.

FIG. 3 shows respective illustrative functional components of the wallet cloud service 135 and bot platform 230 that support payment and associated asynchronous activities. As shown, the wallet cloud service 135 supports an electronic wallet provider 220 and a data store 305. The wallet cloud service 135 can support multiple services (not shown) that are respectively associated with different users and/or user accounts. The wallet cloud service 135 and wallet provider 220 may be configured as an extension of mainstream banking systems and instruments that support conventional accounts such as checking, savings, and credit accounts. A user has the flexibility to transfer funds between the wallet and conventional accounts. The wallet provider will typically provide management services and perform record keeping.

The bot platform 230 includes a payment manager 320 and a bot application container 330 that supports a chat bot 350. The bot is typically configured to provide interactive experiences and conversations with the user 105 according to design criteria specified by the bot provider. Particular bot behavior and functionality can vary by implementation to support specific e-commerce scenarios. Thus, a bot supporting e-commerce for a catalog of auto parts can be configured differently from a bot supporting e-commerce for airline tickets.

Figure 4:
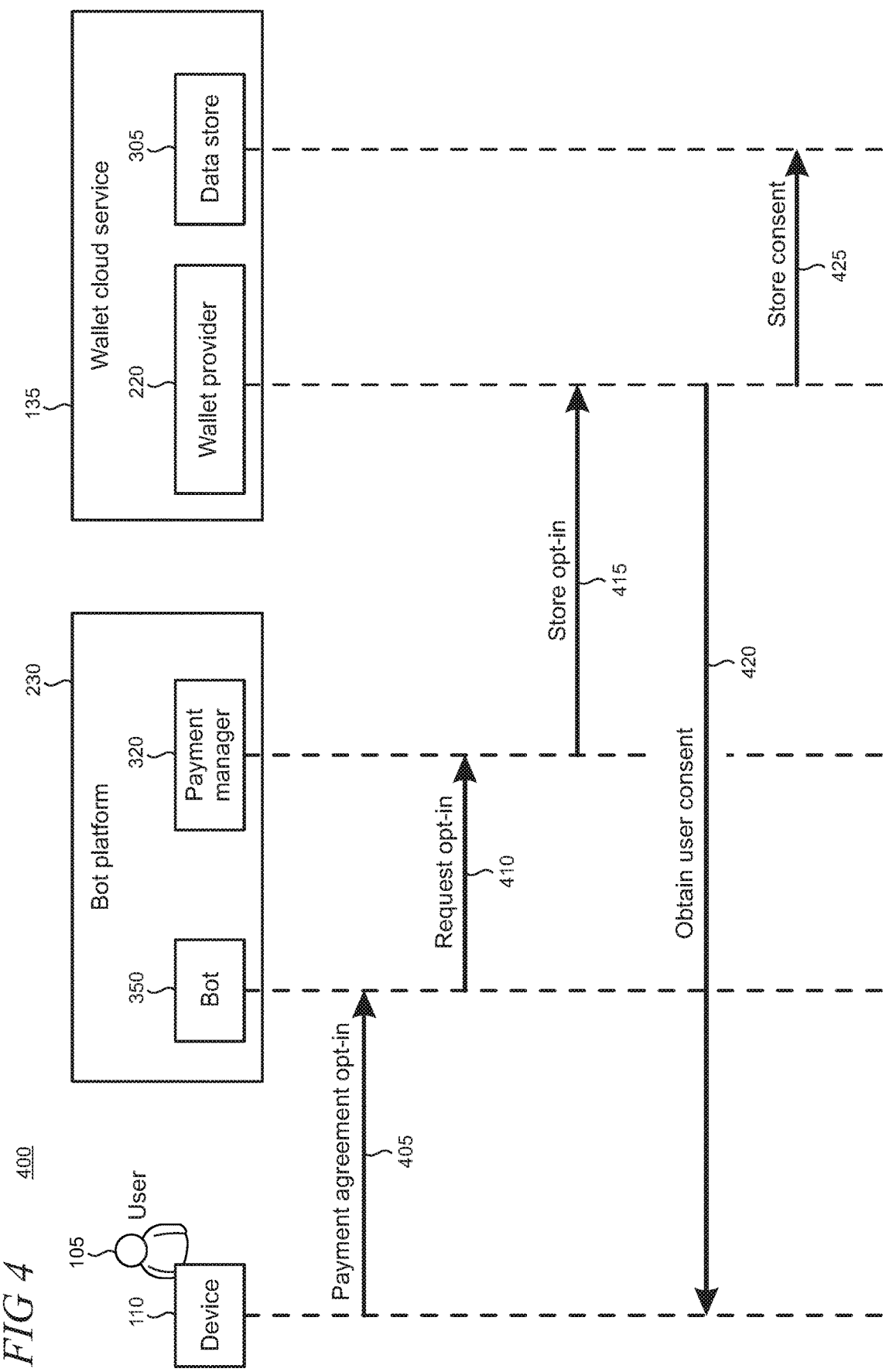
FIG. 4 is an illustrative flow diagram showing a user opting in to a payment agreement.

FIG. 4 is an illustrative flow diagram 400 showing a user 105 at device 110 opting in to a payment agreement. The payment agreement enables payments to occur seamlessly for e-commerce transactions as part of a conversation between the user 105 and a given bot provider. The payment agreement is dynamically created after opt-in between the user and bot, and may be relied upon to support subsequent transactions.

As shown in FIG. 4, the user 105 interacts with the bot 350 (as indicated by line 405) to opt in to the payment agreement. The interaction can be part of a conversation supported by an application 210 or the web browser 215, for example, through interactions with the bot platform 230 over the network 115 (FIG. 1). Depending on implementation, the conversation between the user and the bot can be conducted using text, voice, or combinations thereof.

At line 410, the bot requests the opt-in from the payment manager 320. At line 415, the payment manager communicates with the wallet provider 220, for example over the network 115 (FIG. 1) to store the opt-in. At line 420, the wallet provider 220 seeks consent from the user to the creation of the payment agreement. At line 425, when the user's consent is received, it is stored in the data store 305.

Figure 5:
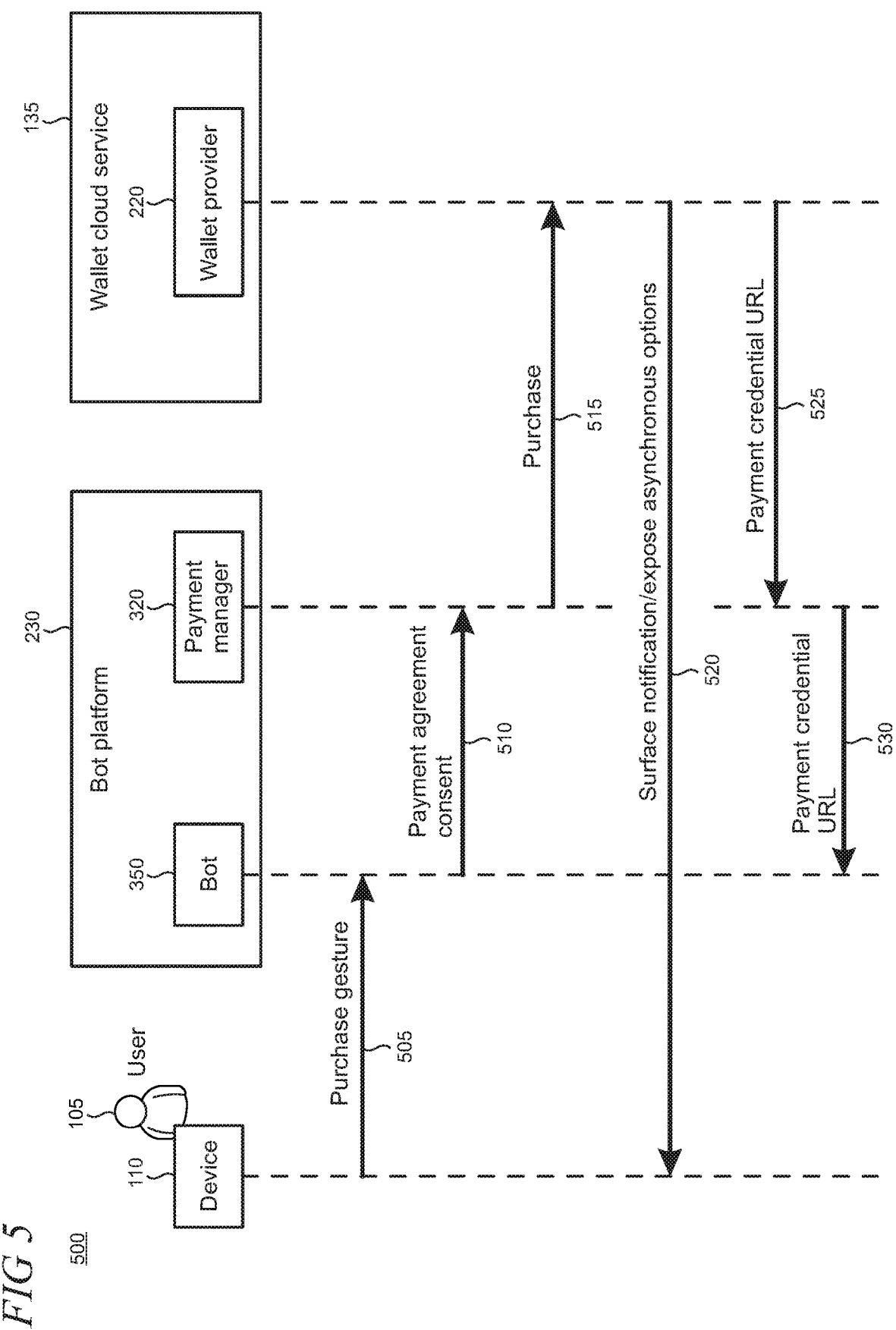
FIG. 5 is an illustrative flow diagram showing execution of a payment agreement.

FIG. 5 is an illustrative flow diagram 500 showing execution of a payment agreement as part of an e-commerce transaction, for example, a purchase of goods or services. The flow begins at line 505 when the user makes a purchase gesture in a conversation with the bot 350. At line 510, the bot provides the user's consent to the payment agreement to the payment manager 320 at the bot platform 230. At line 515, the payment manager signals the purchase to the wallet provider 220 using, for example, communications carried over the network 115 (FIG. 1).

At line 520, a notification of the purchase is provided to the user by the wallet provider 220. The notification can be implemented over the network 115 (FIG. 1). The notification can be surfaced on a user interface of the device 110 by the browser or application. The notification can be included as a part of the conversation between the user and the bot, or be separate from the conversation.

The user is also provided with options to change terms of the purchase such as payment method (e.g., bank account used as funding source), ship-to address (e.g., home address, office address, address of a gift recipient), shipping method (e.g., choice of carrier), shipping speed (e.g., normal, expedited), purchase quantity, item details (e.g., color, size, style, etc.). The user can also cancel the transaction. Such optional changes are asynchronous activities to the underlying payment.

The asynchronous behaviors of CaaP are enabled by utilization of a payment credential URL. As shown by line 525, the wallet provider 220 sends the payment credential URL to the payment manager 320 in the bot platform. At line 530, the payment credential URL is provided to the bot 350. The bot provider (or an entity or agent authorized by the bot provider to function as the bot provider's payment delegate) can subsequently call the payment credential URL to receive an actual payment credential to thereby obtain payment for the transaction. The bot provider or payment delegate can rely on the payment agreement established in the process flows shown in FIGS. 4 and 5 for subsequent transactions conducted at later times.

Figure 6:
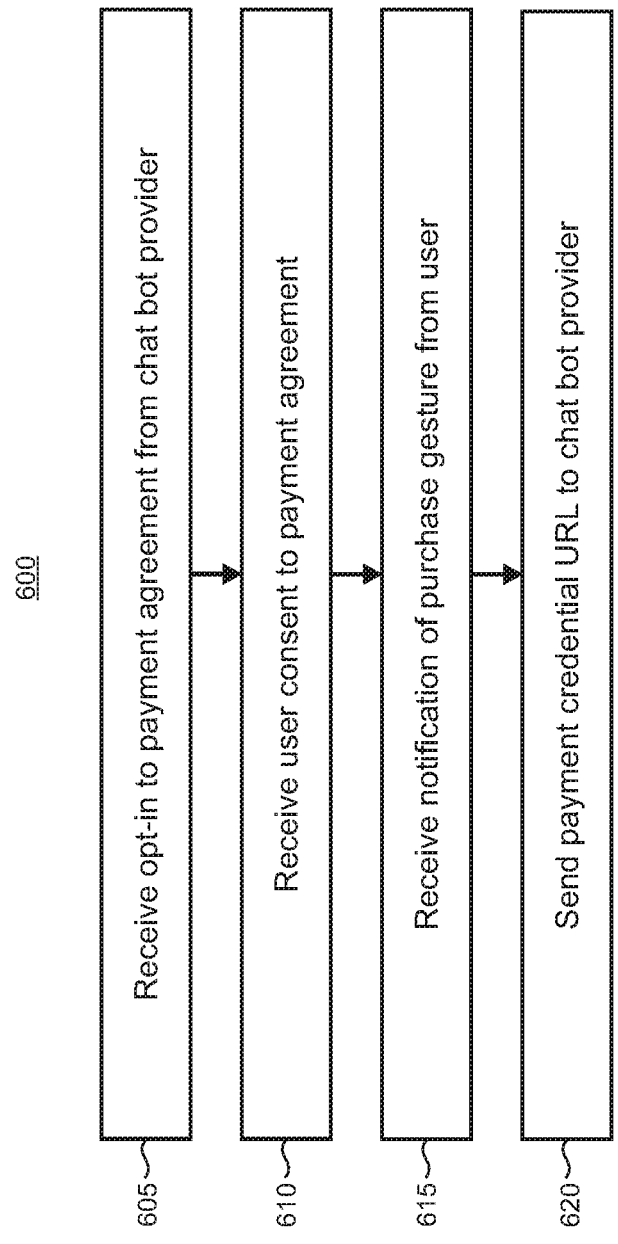
FIGS. 6, 7, and 8 show illustrative methods that may be performed when implementing the present Conversation as a Platform (CaaP)

FIG. 6 shows a flowchart of an illustrative method 600 that may be utilized by one or more computer servers associated with a wallet provider. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

At step 605, an opt-in from a user to a payment agreement is received by the wallet provider from the chat bot provider. At step 610, the wallet provider receives consent from the user to the payment agreement. At step 615, the wallet provider receives notification from the chat bot provider that the user made a purchase gesture to initiate a transaction with the chat bot provider. At step 620, the wallet provider will provide a payment credential URL to the chat bot provider which can be followed to obtain an actual payment credential.

Figure 7:
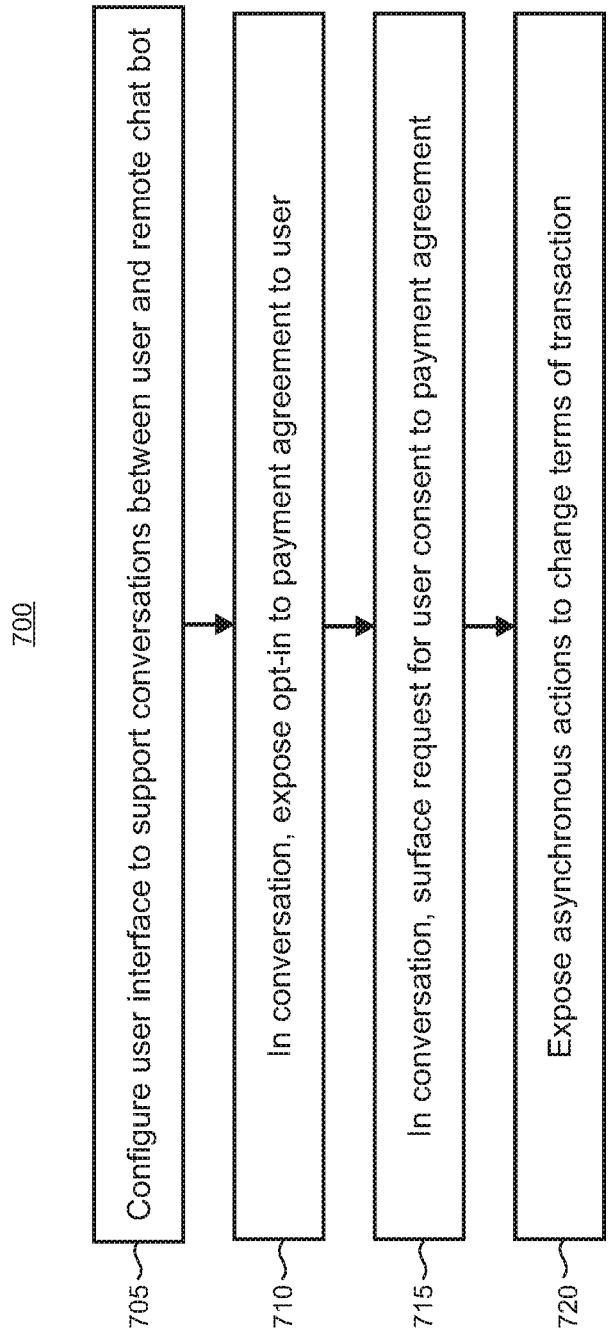

FIG. 7 shows a flowchart of an illustrative method 700 that may be performed on a computing device (e.g., device 110 in FIG. 1). At step 705, the UI of the computing device is configured to support conversations between the device user and a remote chat bot. At step 710, in a conversation, an opt-in to a payment agreement is exposed to the user on the device UI. At step 715, in a conversation, a request for user consent to the payment agreement is surfaced on the device UI. At step 720, asynchronous actions are exposed to the user to enable terms of a transaction (such as payment method, ship-to address, etc.) to be altered.

Figure 8:
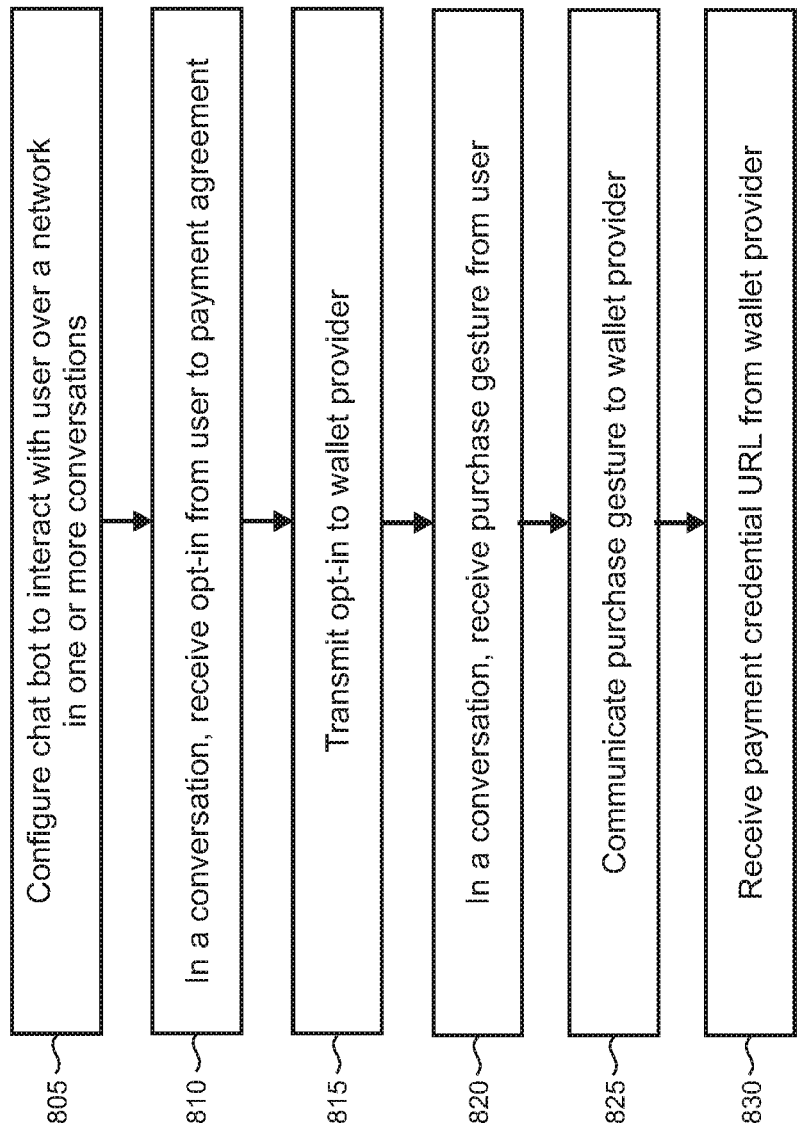

FIG. 8 shows a flowchart of an illustrative method 800 that may be utilized by a chat bot provider. At step 805, a chat bot is configured to interact with a remote computing device user over a network in one or more conversations. At step 810, in a conversation, the chat bot receives an opt-in from the user to a payment agreement. At step 815, the opt-in is transmitted by the chat bot provider to the wallet provider. At step 820, in a conversation, a purchase gesture is received from the user. The purchase gesture is communicated to the wallet provider at step 825. The chat bot provider receives a payment credential URL from the wallet provider at step 830.

Figure 9:
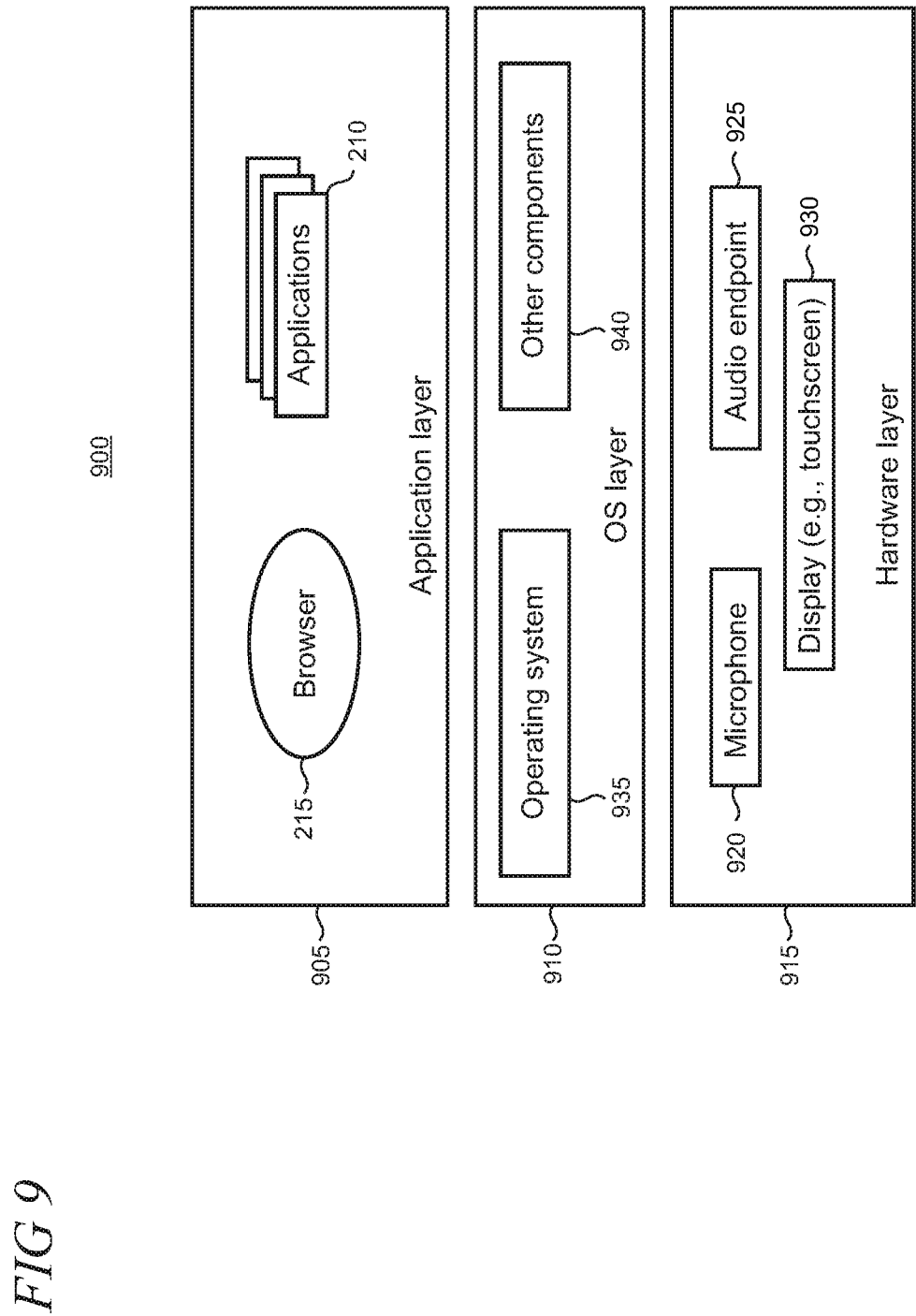
FIG. 9 shows an illustrative layered architecture that may be implemented using software, hardware, firmware, or combinations thereof.

FIG. 9 shows an illustrative layered architecture 900 that may be instantiated on a given device 110 (FIG. 1). The architecture 900 is typically implemented in software, although combinations of software, firmware, and/or hardware may also be utilized in some cases. The architecture 900 is arranged in layers and includes an application layer 905, an OS (operating system) layer 910, and a hardware layer 915.

The hardware layer 915 provides an abstraction of the various hardware used by the device 110 (e.g., input and output devices, networking and radio hardware, etc.) to the layers above it. In this illustrative example, the hardware layer 915 supports a microphone 920, an audio endpoint 925 which may include, for example, the device's internal speaker, a wired or wireless headset/earpiece, external speaker/device, and the like, and a display 930 such as touchscreen. The illustrative hardware may be utilized, for example, to support conversations between the user 105 and chat bot 350 using text- and/or voice-based interactions.

The application layer 905 in this illustrative example supports the web browser 215 and various applications 210 including for example productivity, e-commerce, social media, entertainment, finance, news and information applications, web applications, web services, and the like. In typical implementations of CaaP, the applications 210 can include applications which are adapted for e-commerce with specific e-commerce sites and bot providers. However, the browser 215 may also be utilized to support a diverse range of CaaP interactions between a user and bot providers that are comprehensive and rich. The applications 210 are often implemented using locally executing code. However, in some cases, these applications can rely on services and/or remote code execution provided by remote servers or other computing platforms such as those supported by an application service, web service, service provider, or other cloud-based resources, for example as shown in FIG. 2 and described in the accompanying text above.

The OS layer 910 supports an OS 935 and various other components 940. In some implementations, the OS 935 and/or other components 940 may interact with a remote service (not shown). That is, elements in the OS layer in some implementations can partially utilize or fully utilize remote code execution supported at the remote service, or using other remote resources, for example, to obtain updates and data, and perform suitable actions to implement various functionalities thereof. In addition, the OS 935 may utilize and/or interact with the other components 940 (and/or other components that are instantiated in the other layers of the architecture 900) as may be needed to implement the various features and functions described herein. In some implementations, some or all of the functionalities of the components shown in the architecture can be incorporated into the OS 935 and the particular division of functionality between the components can be selected as a matter of design choice.

Figure 10:
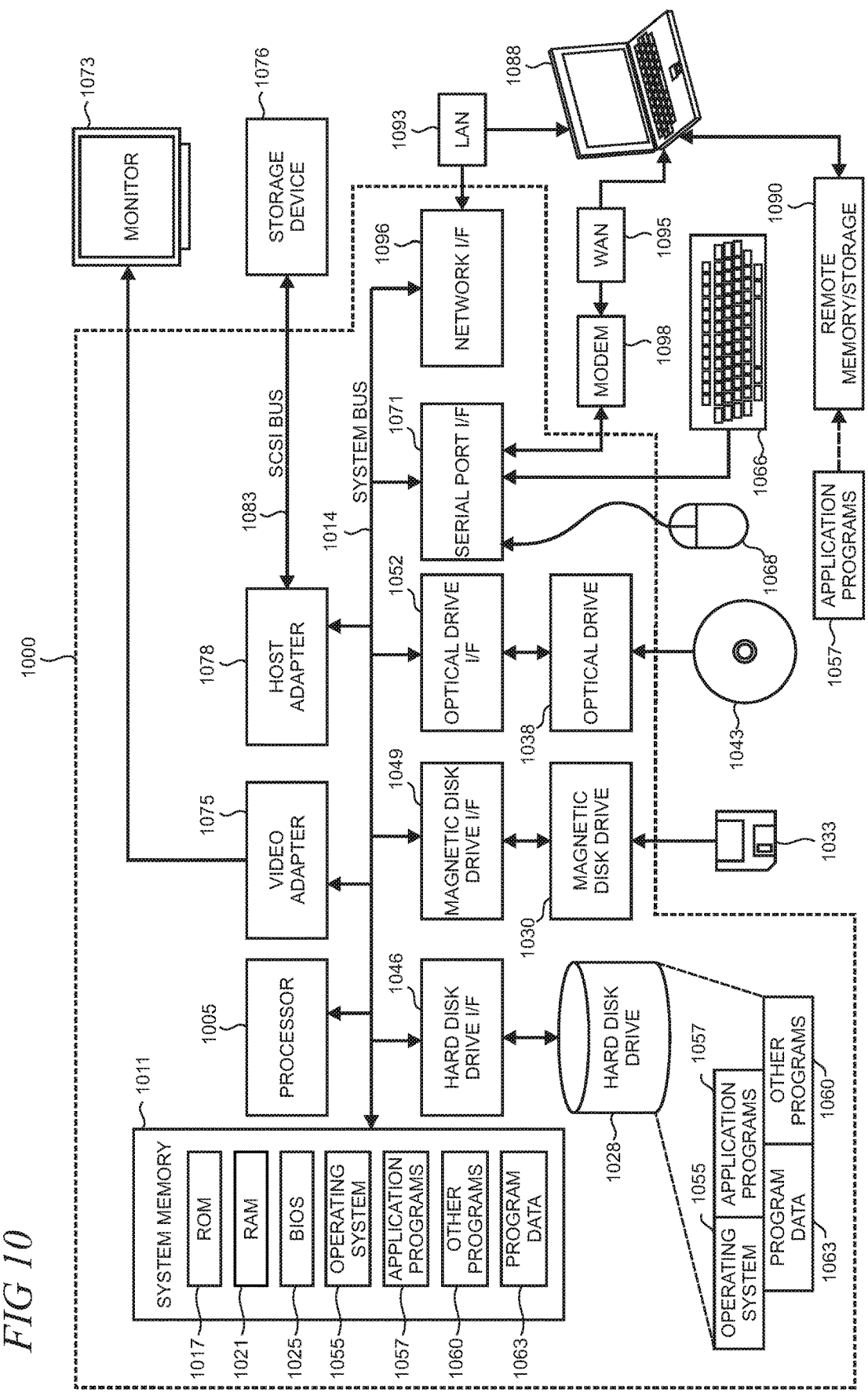
FIG. 10 is a simplified block diagram of an illustrative computer system such as a personal computer (PC)

FIG. 10 is a simplified block diagram of an illustrative computer system 1000 such as a PC, client machine, or server with which the present CaaP may be implemented. Computer system 1000 includes a processor 1005, a system memory 1011, and a system bus 1014 that couples various system components including the system memory 1011 to the processor 1005. The system bus 1014 may be any of several types of bus structures including a memory bus or memory controller, a peripheral bus, or a local bus using any of a variety of bus architectures. The system memory 1011 includes read only memory (ROM) 1017 and random access memory (RAM) 1021. A basic input/output system (BIOS) 1025, containing the basic routines that help to transfer information between elements within the computer system 1000, such as during startup, is stored in ROM 1017. The computer system 1000 may further include a hard disk drive 1028 for reading from and writing to an internally disposed hard disk (not shown), a magnetic disk drive 1030 for reading from or writing to a removable magnetic disk 1033 (e.g., a floppy disk), and an optical disk drive 1038 for reading from or writing to a removable optical disk 1043 such as a CD (compact disc), DVD (digital versatile disc), or other optical media. The hard disk drive 1028, magnetic disk drive 1030, and optical disk drive 1038 are connected to the system bus 1014 by a hard disk drive interface 1046, a magnetic disk drive interface 1049, and an optical drive interface 1052, respectively. The drives and their associated computer-readable storage media provide non-volatile storage of computer-readable instructions, data structures, program modules, and other data for the computer system 1000. Although this illustrative example includes a hard disk, a removable magnetic disk 1033, and a removable optical disk 1043, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present CaaP. In addition, as used herein, the term computer-readable storage media includes one or more instances of a media type (e.g., one or more magnetic disks, one or more CDs, etc.). For purposes of this specification and the claims, the phrase "computer-readable storage medium" and variations thereof are non-transitory, and do not include waves, signals, and/or other transitory and/or intangible communication media.

A number of program modules may be stored on the hard disk, magnetic disk 1033, optical disk 1043, ROM 1017, or RAM 1021, including an operating system 1055, one or more application programs 1057, other program modules 1060, and program data 1063. A user may enter commands and information into the computer system 1000 through input devices such as a keyboard 1066 and pointing device 1068 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1005 through a serial port interface 1071 that is coupled to the system bus 1014, but may be connected by other interfaces, such as a parallel port, game port, or universal serial bus (USB). A monitor 1073 or other type of display device is also connected to the system bus 1014 via an interface, such as a video adapter 1075. In addition to the monitor 1073, personal computers typically include other peripheral output devices (not shown), such as speakers and printers. The illustrative example shown in FIG. 10 also includes a host adapter 1078, a Small Computer System Interface (SCSI) bus 1083, and an external storage device 1076 connected to the SCSI bus 1083.

The computer system 1000 is operable in a networked environment using logical connections to one or more remote computers, such as a remote computer 1088. The remote computer 1088 may be selected as another personal computer, a server, a router, a network PC, a peer device, or other common network node, and typically includes many or all of the elements described above relative to the computer system 1000, although only a single representative remote memory/storage device 1090 is shown in FIG. 10. The logical connections depicted in FIG. 10 include a local area network (LAN) 1093 and a wide area network (WAN) 1095. Such networking environments are often deployed, for example, in offices, enterprise-wide computer networks, intranets, and the Internet.

When used in a LAN networking environment, the computer system 1000 is connected to the local area network 1093 through a network interface or adapter 1096. When used in a WAN networking environment, the computer system 1000 typically includes a broadband modem 1098, network gateway, or other means for establishing communications over the wide area network 1095, such as the Internet. The broadband modem 1098, which may be internal or external, is connected to the system bus 1014 via a serial port interface 1071. In a networked environment, program modules related to the computer system 1000, or portions thereof, may be stored in the remote memory storage device 1090. It is noted that the network connections shown in FIG. 10 are illustrative and other means of establishing a communications link between the computers may be used depending on the specific requirements of an application of the present CaaP.

Figure 11:
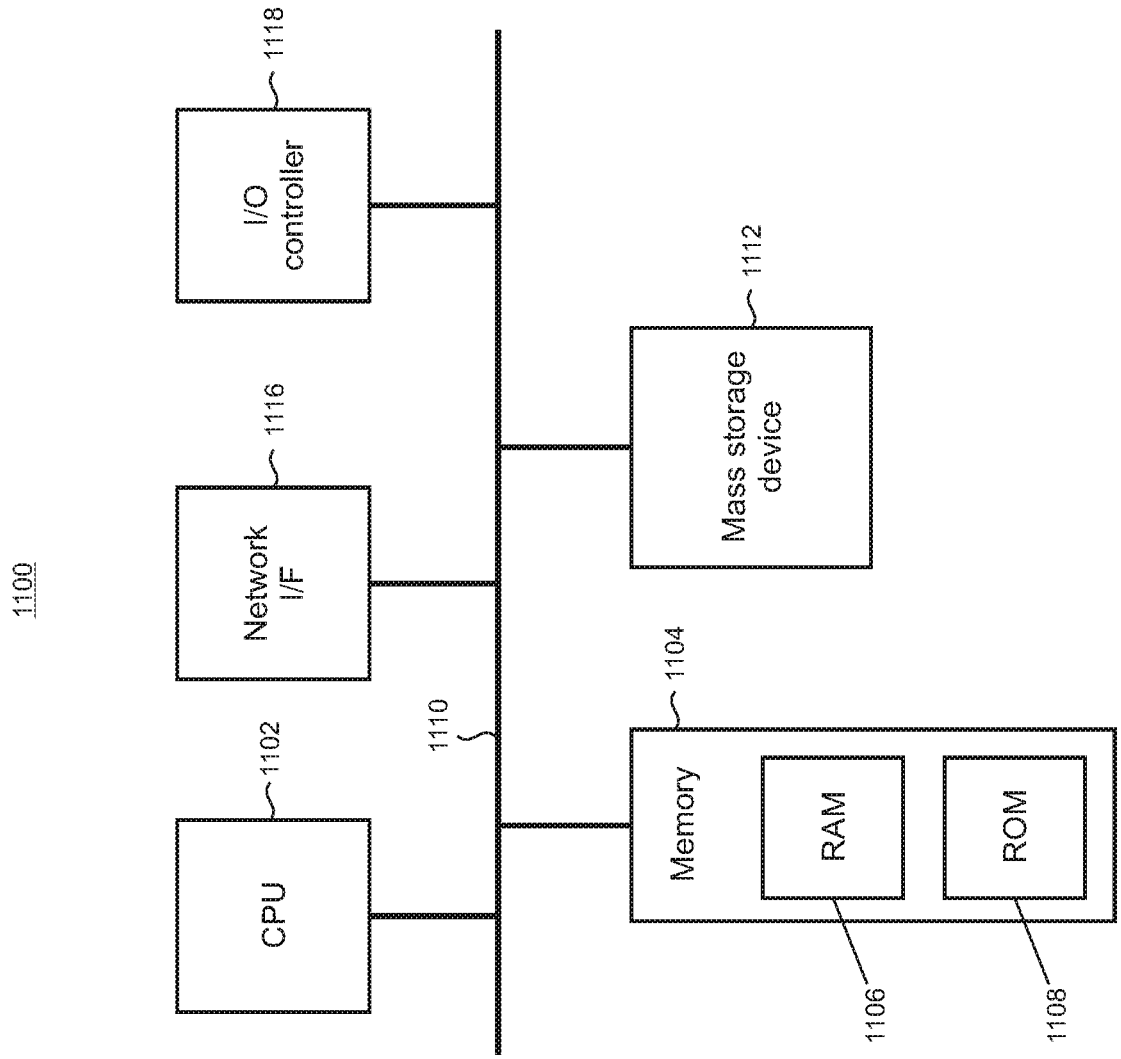
FIG. 11 shows a block diagram of an illustrative device that may be used to implement the present CaaP.

FIG. 11 shows an illustrative computer architecture 1100 capable of executing the various components described herein for providing the present CaaP. Thus, the architecture 1100 illustrated in FIG. 11 shows an architecture that may be adapted for a server computer, mobile phone, a PDA, a smartphone, a desktop computer, a netbook computer, a tablet computer, GPS device, gaming console, and/or a laptop computer. The architecture 1100 may be utilized to execute any aspect of the components presented herein.

The architecture 1100 illustrated in FIG. 11 includes a CPU (Central Processing Unit) 1102, a system memory 1104, including a RAM 1106 and a ROM 1108, and a system bus 1110 that couples the memory 1104 to the CPU 1102. A basic input/output system containing the basic routines that help to transfer information between elements within the architecture 1100, such as during startup, is stored in the ROM 1108. The architecture 1100 further includes a mass storage device 1112 for storing software code or other computer-executed code that is utilized to implement applications, the file system, and the operating system.

The mass storage device 1112 is connected to the CPU 1102 through a mass storage controller (not shown) connected to the bus 1110. The mass storage device 1112 and its associated computer-readable storage media provide non-volatile storage for the architecture 1100.

Although the description of computer-readable storage media contained herein refers to a mass storage device, such as a hard disk or CD-ROM drive, it may be appreciated by those skilled in the art that computer-readable storage media can be any available storage media that can be accessed by the architecture 1100.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1100.

According to various embodiments, the architecture 1100 may operate in a networked environment using logical connections to remote computers through a network. The architecture 1100 may connect to the network through a network interface unit 1116 connected to the bus 1110. It may be appreciated that the network interface unit 1116 also may be utilized to connect to other types of networks and remote computer systems. The architecture 1100 also may include an input/output controller 1118 for receiving and processing input from a number of other devices, including a keyboard, mouse, or electronic stylus (not shown in FIG. 11). Similarly, the input/output controller 1118 may provide output to a display screen, a printer, or other type of output device (also not shown in FIG. 11).

It may be appreciated that the software components described herein may, when loaded into the CPU 1102 and executed, transform the CPU 1102 and the overall architecture 1100 from a general-purpose computing system into a special-purpose computing system customized to facilitate the functionality presented herein. The CPU 1102 may be constructed from any number of transistors or other discrete circuit elements, which may individually or collectively assume any number of states. More specifically, the CPU 1102 may operate as a finite-state machine, in response to executable instructions contained within the software modules disclosed herein. These computer-executable instructions may transform the CPU 1102 by specifying how the CPU 1102 transitions between states, thereby transforming the transistors or other discrete hardware elements constituting the CPU 1102.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1100 in order to store and execute the software components presented herein. It also may be appreciated that the architecture 1100 may include other types of computing devices, including handheld computers, embedded computer systems, smartphones, PDAs, and other types of computing devices known to those skilled in the art. It is also contemplated that the architecture 1100 may not include all of the components shown in FIG. 11, may include other components that are not explicitly shown in FIG. 11, or may utilize an architecture completely different from that shown in FIG. 11.

Figure 12:
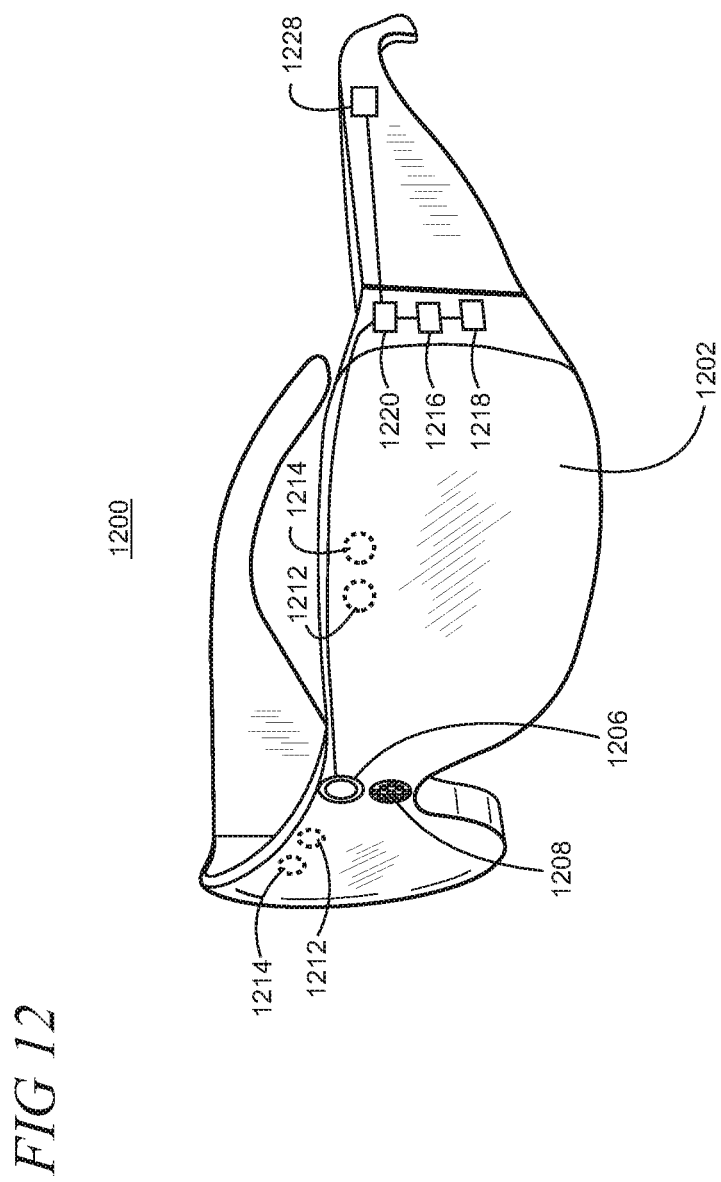
FIG. 12 is a pictorial view of an illustrative example of a virtual reality or mixed reality head mounted display (HMD) device.
Figure 13:
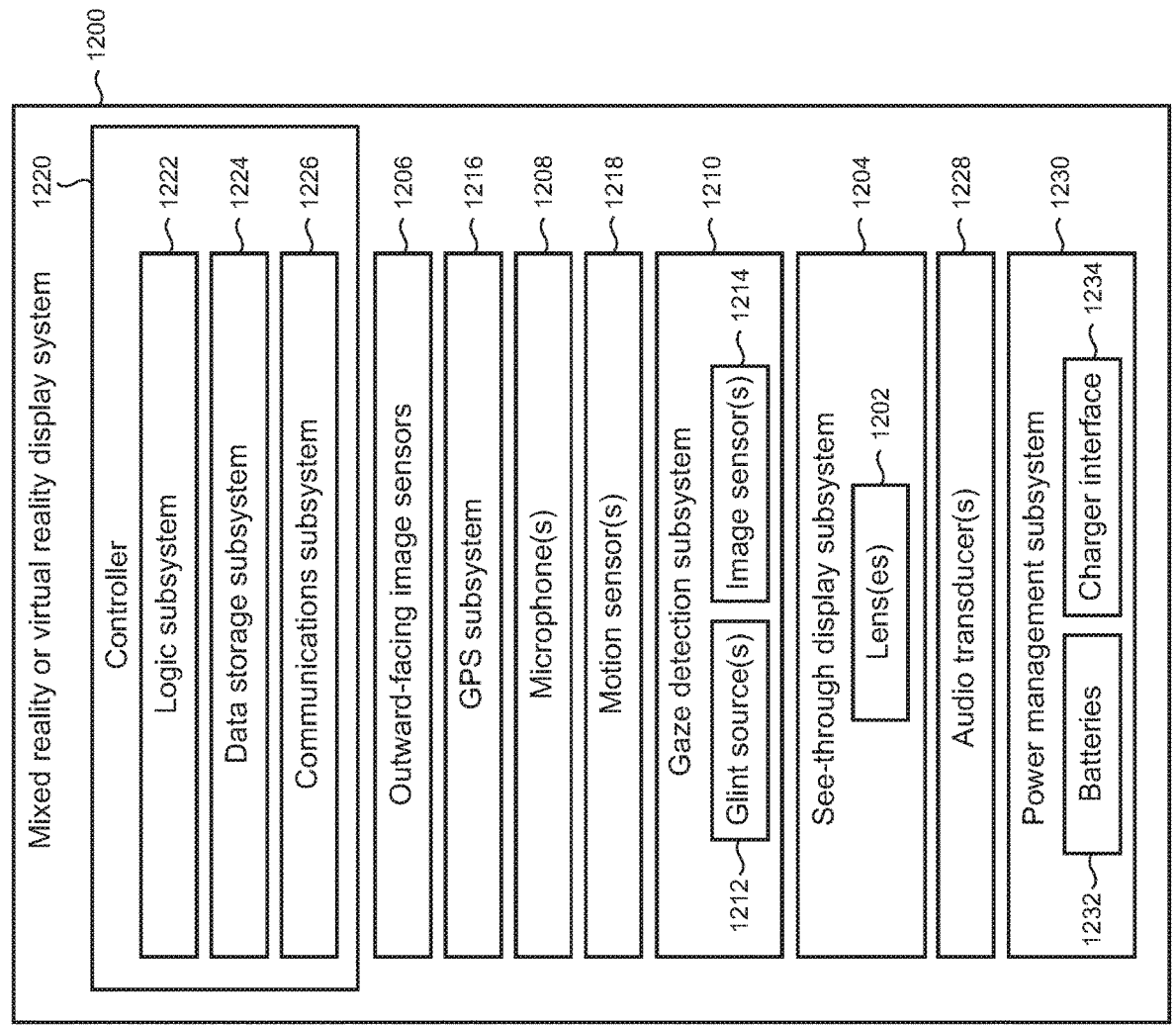
FIG. 13 shows a block diagram of an illustrative example of a virtual reality or mixed reality HMD device.

FIG. 12 shows one particular illustrative example of a see-through, augmented reality or virtual reality display system 1200, and FIG. 13 shows a functional block diagram of the system 1200. Display system 1200 comprises one or more lenses 1202 that form a part of a see-through display subsystem 1204, such that images may be displayed using lenses 1202 (e.g. using projection onto lenses 1202, one or more waveguide systems incorporated into the lenses 1202, and/or in any other suitable manner). Display system 1200 further comprises one or more outward-facing image sensors 1206 configured to acquire images of a background scene and/or physical environment being viewed by a user, and may include one or more microphones 1208 configured to detect sounds, such as voice commands from a user. Outward-facing image sensors 1206 may include one or more depth sensors and/or one or more two-dimensional image sensors. In alternative arrangements, as noted above, an augmented reality or virtual reality display system, instead of incorporating a see-through display subsystem, may display augmented reality or virtual reality images through a viewfinder mode for an outward-facing image sensor.

The display system 1200 may further include a gaze detection subsystem 1210 configured for detecting a direction of gaze of each eye of a user or a direction or location of focus, as described above. Gaze detection subsystem 1210 may be configured to determine gaze directions of each of a user's eyes in any suitable manner. For example, in the illustrative example shown, a gaze detection subsystem 1210 includes one or more glint sources 1212, such as infrared light sources, that are configured to cause a glint of light to reflect from each eyeball of a user, and one or more image sensors 1214, such as inward-facing sensors, that are configured to capture an image of each eyeball of the user. Changes in the glints from the user's eyeballs and/or a location of a user's pupil, as determined from image data gathered using the image sensor(s) 1214, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 1210 may have any suitable number and arrangement of light sources and image sensors. In some implementations, the gaze detection subsystem 1210 may be omitted.

The display system 1200 may also include additional sensors. For example, display system 1200 may comprise a global positioning system (GPS) subsystem 1216 to allow a location of the display system 1200 to be determined. This may help to identify real-world objects, such as buildings, etc. that may be located in the user's adjoining physical environment.

The display system 1200 may further include one or more motion sensors 1218 (e.g., inertial, multi-axis gyroscopic, or acceleration sensors) to detect movement and position/orientation/pose of a user's head when the user is wearing the system as part of an augmented reality or virtual reality HMD device. Motion data may be used, potentially along with eye-tracking glint data and outward-facing image data, for gaze detection, as well as for image stabilization to help correct for blur in images from the outward-facing image sensor(s) 1206. The use of motion data may allow changes in gaze location to be tracked even if image data from outward-facing image sensor(s) 1206 cannot be resolved.

In addition, motion sensors 1218, as well as microphone(s) 1208 and gaze detection subsystem 1210, also may be employed as user input devices, such that a user may interact with the display system 1200 via gestures of the eye, neck and/or head, as well as via verbal commands in some cases. It may be understood that sensors illustrated in FIGS. 12 and 13 and described in the accompanying text are included for the purpose of example and are not intended to be limiting in any manner, as any other suitable sensors and/or combination of sensors may be utilized to meet the needs of a particular implementation. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 1200 can further include a controller 1220 having a logic subsystem 1222 and a data storage subsystem 1224 in communication with the sensors, gaze detection subsystem 1210, display subsystem 1204, and/or other components through a communications subsystem 1226. The communications subsystem 1226 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 1224 may include instructions stored thereon that are executable by logic subsystem 1222, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 1200 is configured with one or more audio transducers 1228 (e.g., speakers, earphones, etc.) so that audio can be utilized as part of an augmented reality or virtual reality experience. A power management subsystem 1230 may include one or more batteries 1232 and/or protection circuit modules (PCMs) and an associated charger interface 1234 and/or remote power interface for supplying power to components in the display system 1200.

It may be appreciated that the display system 1200 is described for the purpose of example, and thus is not meant to be limiting. It may be further understood that the display device may include additional and/or alternative sensors, cameras, microphones, input devices, output devices, etc. than those shown without departing from the scope of the present arrangement. Additionally, the physical configuration of a display device and its various sensors and subcomponents may take a variety of different forms without departing from the scope of the present arrangement.

Figure 14:
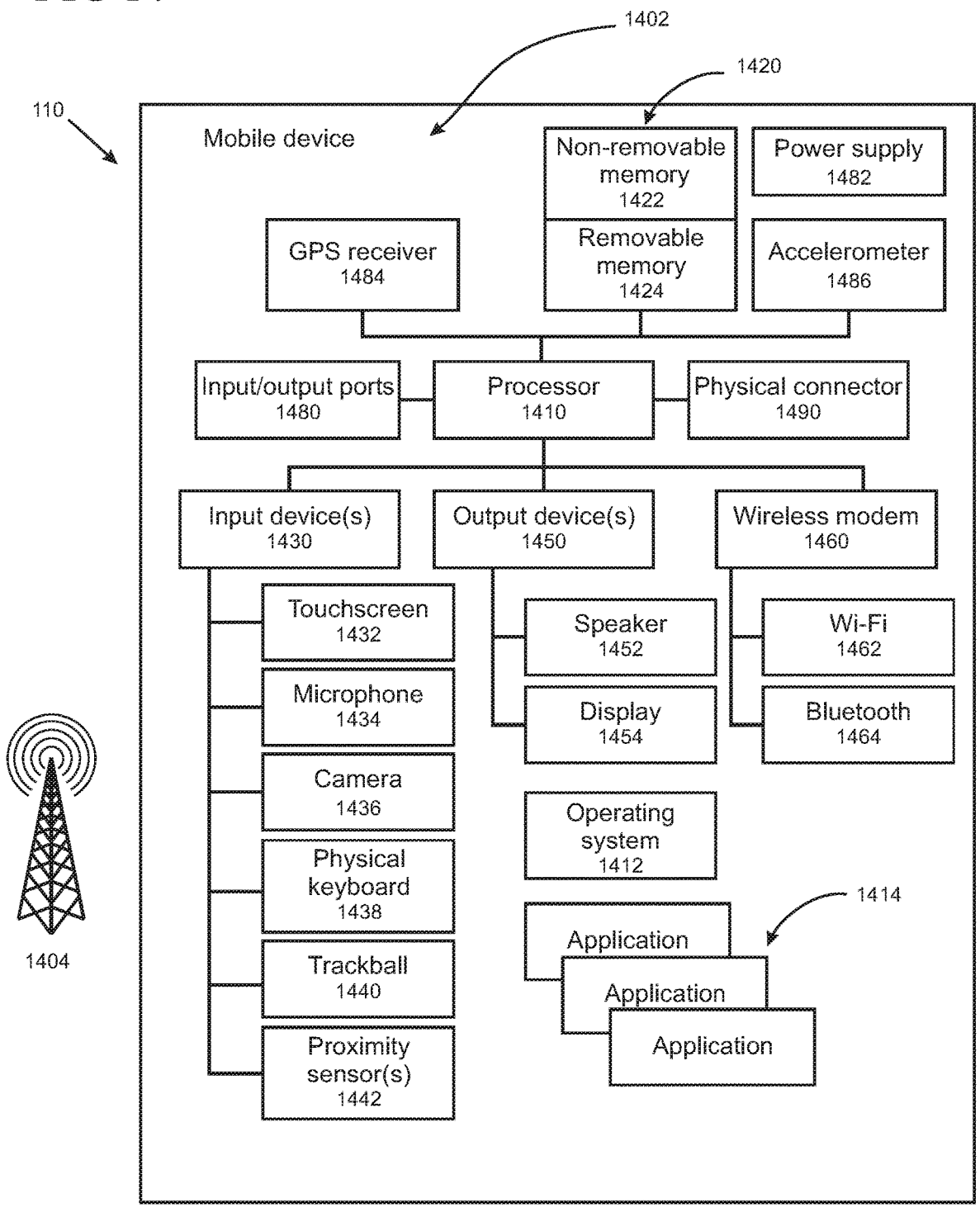
FIG. 14 is a block diagram of an illustrative device such as a mobile phone or smartphone.

FIG. 14 is a functional block diagram of an illustrative mobile device 110 such as a mobile phone or smartphone including a variety of optional hardware and software components, shown generally at 1402. Any component 1402 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 1404, such as a cellular or satellite network.

The illustrated mobile device 110 can include a controller or processor 1410 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1412 can control the allocation and usage of the components 1402, including power states, above-lock states, and below-lock states, and provides support for one or more application programs 1414. The application programs can include common mobile computing applications (e.g., image-capture applications, email applications, calendars, contact managers, web browsers, messaging applications), or any other computing application.

The illustrated mobile device 110 can include memory 1420. Memory 1420 can include non-removable memory 1422 and/or removable memory 1424. The non-removable memory 1422 can include RAM, ROM, Flash memory, a hard disk, or other well-known memory storage technologies. The removable memory 1424 can include Flash memory or a Subscriber Identity Module (SIM) card, which is well known in GSM (Global System for Mobile communications) systems, or other well-known memory storage technologies, such as "smart cards." The memory 1420 can be used for storing data and/or code for running the operating system 1412 and the application programs 1414. Example data can include web pages, text, images, sound files, video data, or other data sets to be sent to and/or received from one or more network servers or other devices via one or more wired or wireless networks.

The memory 1420 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the mobile device 110.

The memory 1420 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 1430; such as a touchscreen 1432; microphone 1434 for implementation of voice input for voice recognition, voice commands and the like; camera 1436; physical keyboard 1438; trackball 1440; and/or proximity sensor 1442; and one or more output devices 1450, such as a speaker 1452 and one or more displays 1454. Other input devices (not shown) using gesture recognition may also be utilized in some cases. Other possible output devices (not shown) can include piezoelectric or haptic output devices. Some devices can serve more than one input/output function. For example, touchscreen 1432 and display 1454 can be combined into a single input/output device.

A wireless modem 1460 can be coupled to an antenna (not shown) and can support two-way communications between the processor 1410 and external devices, as is well understood in the art. The modem 1460 is shown generically and can include a cellular modem for communicating with the mobile communication network 1404 and/or other radio-based modems (e.g., Bluetooth 1464 or Wi-Fi 1462). The wireless modem 1460 is typically configured for communication with one or more cellular networks, such as a GSM network for data and voice communications within a single cellular network, between cellular networks, or between the device and a public switched telephone network (PSTN). The device can further include at least one input/output port 1480, a power supply 1482, a satellite navigation system receiver 1484, such as a GPS receiver, an accelerometer 1486, a gyroscope (not shown), and/or a physical connector 1490, which can be a USB port, IEEE 1394 (FireWire) port, and/or an RS-232 port. The illustrated components 1402 are not required or all-inclusive, as any components can be deleted and other components can be added.

Figure 15:
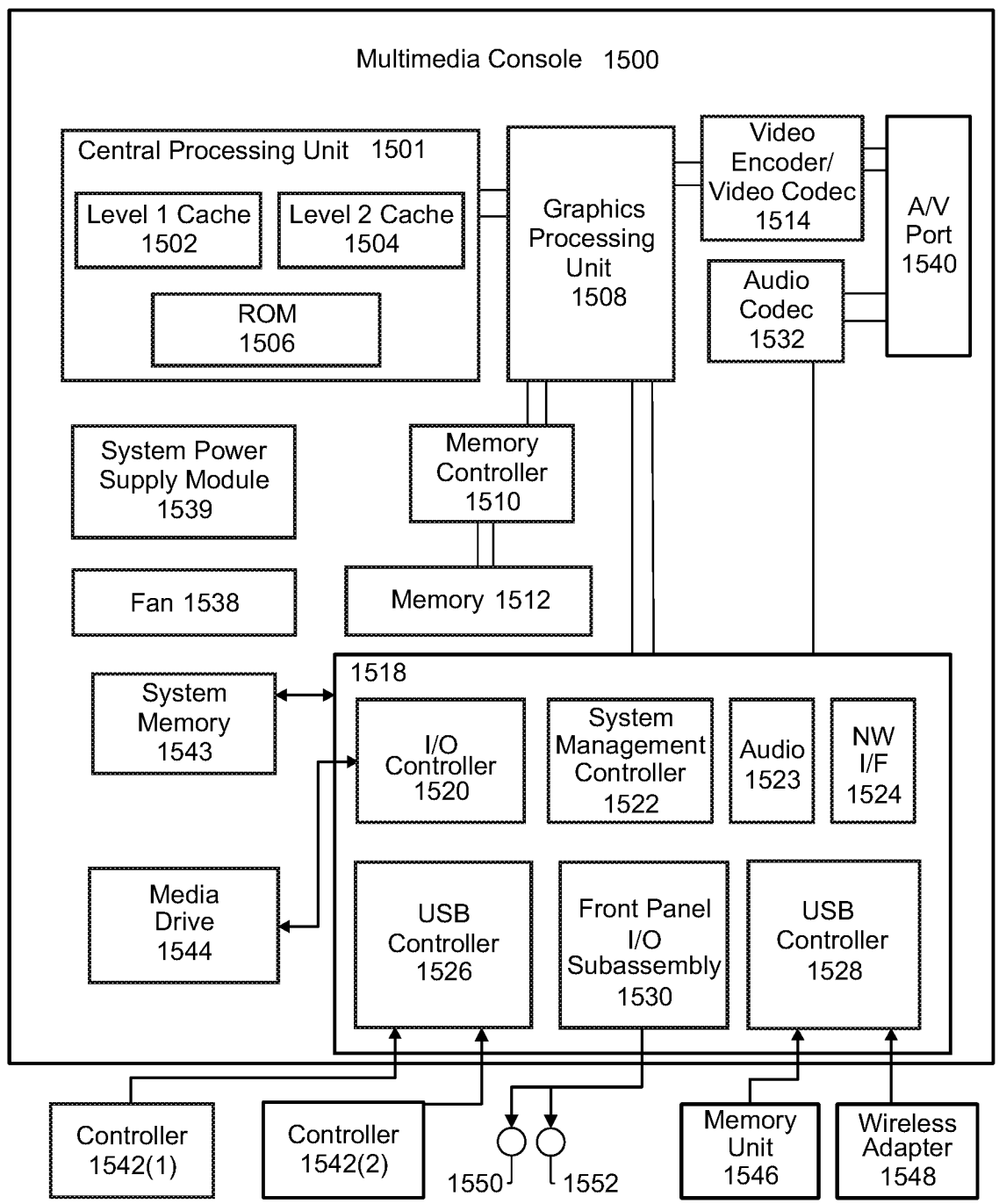
FIG. 15 is a block diagram of an illustrative multimedia console.

FIG. 15 is an illustrative functional block diagram of a multimedia console 1500. The multimedia console 1500 has a central processing unit (CPU) 1501 having a level 1 cache 1502, a level 2 cache 1504, and a Flash ROM (Read Only Memory) 1506. The level 1 cache 1502 and the level 2 cache 1504 temporarily store data and hence reduce the number of memory access cycles, thereby improving processing speed and throughput. The CPU 1501 may be configured with more than one core, and thus, additional level 1 and level 2 caches 1502 and 1504. The Flash ROM 1506 may store executable code that is loaded during an initial phase of a boot process when the multimedia console 1500 is powered ON.

A graphics processing unit (GPU) 1508 and a video encoder/video codec (coder/decoder) 1514 form a video processing pipeline for high speed and high resolution graphics processing. Data is carried from the GPU 1508 to the video encoder/video codec 1514 via a bus. The video processing pipeline outputs data to an A/V (audio/video) port 1540 for transmission to a television or other display. A memory controller 1510 is connected to the GPU 1508 to facilitate processor access to various types of memory 1512, such as, but not limited to, a RAM.

The multimedia console 1500 includes an I/O controller 1520, a system management controller 1522, an audio processing unit 1523, a network interface controller 1524, a first USB (Universal Serial Bus) host controller 1526, a second USB controller 1528, and a front panel I/O subassembly 1530 that are preferably implemented on a module 1518. The USB controllers 1526 and 1528 serve as hosts for peripheral controllers 1542(1) and 1542(2), a wireless adapter 1548, and an external memory device 1546 (e.g., Flash memory, external CD/DVD ROM drive, removable media, etc.). The network interface controller 1524 and/or wireless adapter 1548 provide access to a network (e.g., the Internet, home network, etc.) and may be any of a wide variety of various wired or wireless adapter components including an Ethernet card, a modem, a Bluetooth module, a cable modem, or the like.

System memory 1543 is provided to store application data that is loaded during the boot process. A media drive 1544 is provided and may comprise a DVD/CD drive, hard drive, or other removable media drive, etc. The media drive 1544 may be internal or external to the multimedia console 1500. Application data may be accessed via the media drive 1544 for execution, playback, etc. by the multimedia console 1500. The media drive 1544 is connected to the I/O controller 1520 via a bus, such as a Serial ATA bus or other high speed connection (e.g., IEEE 1394).

The system management controller 1522 provides a variety of service functions related to assuring availability of the multimedia console 1500. The audio processing unit 1523 and an audio codec 1532 form a corresponding audio processing pipeline with high fidelity and stereo processing. Audio data is carried between the audio processing unit 1523 and the audio codec 1532 via a communication link. The audio processing pipeline outputs data to the A/V port 1540 for reproduction by an external audio player or device having audio capabilities.

The front panel I/O subassembly 1530 supports the functionality of the power button 1550 and the eject button 1552, as well as any LEDs (light emitting diodes) or other indicators exposed on the outer surface of the multimedia console 1500. A system power supply module 1539 provides power to the components of the multimedia console 1500. A fan 1538 cools the circuitry within the multimedia console 1500.

The CPU 1501, GPU 1508, memory controller 1510, and various other components within the multimedia console 1500 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 1500 is powered ON, application data may be loaded from the system memory 1543 into memory 1512 and/or caches 1502 and 1504 and executed on the CPU 1501. The application may present a graphical user interface that provides a consistent user experience when navigating to different media types available on the multimedia console 1500. In operation, applications and/or other media contained within the media drive 1544 may be launched or played from the media drive 1544 to provide additional functionalities to the multimedia console 1500.

The multimedia console 1500 may be operated as a standalone system by simply connecting the system to a television or other display. In this standalone mode, the multimedia console 1500 allows one or more users to interact with the system, watch movies, or listen to music. However, with the integration of broadband connectivity made available through the network interface controller 1524 or the wireless adapter 1548, the multimedia console 1500 may further be operated as a participant in a larger network community.

When the multimedia console 1500 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 1500 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1501 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1542(1) and 1542(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present conversation as a platform to increase task productivity for end users are now presented by way of illustration and not as an exhaustive list of all embodiments. An example includes one or more non-transitory computer-readable memory devices storing instructions which, when executed by one or more processors disposed in a computer server associated with an electronic wallet provider, cause the computer server to: receive an opt-in by a user of a remote computing device to a payment agreement from a provider of a chat bot, the chat bot being configured to converse with a user over a network to obtain the opt-in and receive purchase gestures, the payment agreement underlying one or more transactions between the user and the chat bot provider; receive user consent to the payment agreement; receive notification of a purchase by the user under the payment agreement from the chat bot provider; and send a payment credential URL (Uniform Resource Locator) to the chat bot provider in response to the notification.

In another example, the user consent is stored and utilized for subsequent transactions between the user and the chat bot provider. In another example, the instructions further cause the computer server to receive notification of a second subsequent purchase gesture under the payment agreement from the chat bot provider and send a second payment credential URL to the chat bot provider in response to the notification. In another example, the instructions further cause the computer server to notify the user of the remote computing device of the transaction. In another example, the instructions further cause the computer server to surface actions to the user of the remote computing device to change terms of the purchase. In another example, actions are provided to the user asynchronously from the payment credential URL that is sent to the chat bot provider. In another example, the payment credential URL, when followed, enables the chat bot provider to obtain payment for the transaction.

A further example includes a computing device, comprising: one or more processors; a user interface (UI) supporting one or more of text- or voice-based interactions between the computing device and a user of the computing device; a network interface to couple the device to a network to thereby access a remote e-commerce website; and one or more hardware-based memory devices storing computer-readable instructions which, when executed by the one or more processors, cause the device to configure the UI to support conversations between the user and a remote chat bot, in the conversation with the chat bot, expose an opt-in to a payment agreement to the user, the payment agreement supporting a payment underlying a transaction between the user and a provider of the chat bot, in the conversation with chat bot, surface a request for user consent to the payment agreement, and expose actions to the user through the UI to change terms of the transaction, the actions being exposed asynchronously from the payment underlying the transactions.

In another example, the actions comprise changing one or more of payment method, ship-to address, shipping method, shipping speed, quantity, or purchased item details including one or more of size, style, or color. In another example, the actions comprise canceling the transaction. In another example, the UI is supported by a web browser executing on the computing device or by an application executing on the computing device. In another example, the conversation is conducted using text-based interactions between the user and the chat bot, voice-based interactions between the user and the chat bot, or a combination of text- and voice-based interactions between the user and the chat bot. In another example, the executed instructions further cause the computing device to enable the user to, in the conversation with the chat bot, perform a purchase gesture to initiate the transaction. In another example, the computing device is embodied in one of personal computer, wearable computer, smartphone, mobile phone, tablet computer, or laptop computer.

A further example includes a method for interacting with a computing device user during online activity, comprising: configuring a chat bot to interact with the user over a network, the interaction being performed in one or more conversations that are conducted between the user and the chat bot; in a conversation, receiving an opt-in by the user to a payment agreement that supports one or more underlying purchases by the user from a provider of the chat bot; transmitting the opt-in over a network to a remote wallet provider, the wallet provider supporting an electronic wallet that is associated with the user; in a conversation, receiving a purchase gesture from the user to initiate a purchase; responsively to the purchase gesture, communicating the purchase to the remote wallet provider; receiving a payment credential URL (Uniform Resource Locator) from the wallet provider.

In another example, the method further comprises following the payment credential URL to obtain a payment credential for payment for the purchase. In another example, the opt-in is received in a first conversation between the user and the chat bot and the purchase gesture is received during a second subsequent conversation between the user and the chat bot. In another example, the method further comprises utilizing the payment agreement for one or more subsequent purchases by the user from the chat bot provider. In another example, the chat bot is configured to converse with the user through a user interface supported on the computing device. In another example, the method is performed by an e-commerce website or application.

The subject matter described above is provided by way of illustration only and is not to be construed as limiting. Various modifications and changes may be made to the subject matter described herein without following the example embodiments and applications illustrated and described, and without departing from the true spirit and scope of the present invention, which is set forth in the following claims.

What is claimed:

1. A method for interacting with a computing device user during online activity, comprising:
   operating a bot platform on which two or more different chat bots are operable, the bot platform being configured to interact with two or more different application services respectively comprising two or more different chat bot providers that are respectively associated with the two or more different chat bots;
   configuring each of the two or more different chat bots operating on the bot platform to interact with the user over a network;
   instantiating a payment manager in the bot platform, the payment manager being adapted to facilitate interactions between a chat bot provider among the two or more different chat bot providers and a remote wallet provider over the network;
   in a conversation between the user and a chat bot among the two or more different chat bots operating on the bot platform, receiving an opt-in by the user to a payment agreement with the associated chat bot provider that supports one or more underlying purchases by the user from the chat bot provider;
   transmitting the opt-in over the network to the remote wallet provider from the payment manager, the remote wallet provider supporting an electronic wallet that is associated with the user;
   in the conversation with the chat bot among the two or more different chat bots operating on the bot platform, receiving a purchase gesture from the user to initiate a purchase;
   in response to the purchase gesture, communicating the purchase to the remote wallet provider from the payment manager; and
   receiving a payment credential URL (Uniform Resource Locator) at the payment manager from the remote wallet provider in response to the communication of the purchase from the payment manager.

2. The method of claim 1 further comprising following the payment credential URL to obtain a payment credential for payment for the purchase.

3. The method of claim 1 in which the opt-in is received in a first conversation between the user and the chat bot and the purchase gesture is received during a second subsequent conversation between the user and the chat bot.

4. The method of claim 1 further comprising utilizing the payment agreement for one or more subsequent purchases by the user from the chat bot provider.

5. The method of claim 1 in which the chat bot is configured to converse with the user through a user interface supported on the computing device.

6. The method of claim 1 in which the two or more different application services each comprise a different e-commerce website.

7. One or more non-transitory computer-readable memory devices storing instructions which, when executed by one or more processors disposed in a computing device that is usable by a user, cause the computing device to:
   operate a bot platform on which two or more different chat bots are operable, the bot platform being configured to interact with two or more different application services respectively comprising two or more different chat bot providers that are respectively associated with the two or more different chat bots;
   configure each of the two or more different chat bots operating on the bot platform to interact with the user over a network;
   instantiate a payment manager in the bot platform, the payment manager being adapted to facilitate interactions between a chat bot provider among the two or more different chat bot providers and a remote wallet provider over the network;
   in a conversation between the user and a chat bot among the two or more different chat bots operating on the bot platform, receive an opt-in by the user to a payment agreement with the associated chat bot provider that supports one or more underlying purchases by the user from the chat bot provider;

transmit the opt-in over the network to the remote wallet provider from the payment manager, the remote wallet provider supporting an electronic wallet that is associated with the user;

in the conversation with the chat bot among the two or more different chat bots operating on the bot platform, receive a purchase gesture from the user to initiate a purchase;

in response to the purchase gesture, communicate the purchase to the remote wallet provider from the payment manager; and receive a payment credential URL (Uniform Resource Locator) at the payment manager from the remote wallet provider in response to the communication of the purchase from the payment manager.

8. The one or more non-transitory computer-readable memory devices of claim 7 in which the instructions further cause the computing device to follow the payment credential URL to obtain a payment credential for payment for the purchase.

9. The one or more non-transitory computer-readable memory devices of claim 7 in which the opt-in is received in a first conversation between the user and the chat bot and the purchase gesture is received during a second subsequent conversation between the user and the chat bot.

10. The one or more non-transitory computer-readable memory devices of claim 7 in which the instructions further cause the computing device to utilize the payment agreement for one or more subsequent purchases by the user from the chat bot provider.

11. The one or more non-transitory computer-readable memory devices of claim 7 in which the chat bot is configured to converse with the user through a user interface supported on the computing device.

12. The one or more non-transitory computer-readable memory devices of claim 7 in which the two or more different application services each comprise a different e-commerce website.

13. A computing device that is usable by a user, comprising:

one or more processors; and one or more non-transitory computer-readable memory devices storing instructions which, when executed by one or more processors disposed in a computing device, cause the computing device to operate a bot platform on which two or more different chat bots are operable, the bot platform being configured to interact with two or more different application services respectively comprising two or more different chat bot providers that are respectively associated with the two or more different chat bots;

configure each of the two or more different chat bots operating on the bot platform to interact with the user over a network;

instantiate a payment manager in the bot platform, the payment manager being adapted to facilitate interactions between a chat bot provider among the two or more different chat bot providers and a remote wallet provider over the network;

in a conversation between the user and a chat bot among the two more different chat bots operating on the bot platform, receive an opt-in by the user to a payment agreement with the associated chat bot provider that supports one or more underlying purchases by the user from the chat bot provider;

transmit the opt-in over the network to the remote wallet provider from the payment manager, the remote wallet provider supporting an electronic wallet that is associated with the user;

in the conversation with the chat bot among the two or more different chat bots operating on the bot platform, receive a purchase gesture from the user to initiate a purchase;

in response to the purchase gesture, communicate the purchase to the remote wallet provider from the payment manager; and receive a payment credential URL (Uniform Resource Locator) at the payment manager from the remote wallet provider in response to the communication of the purchase from the payment manager.

14. The computing device of claim 13 in which the instructions further cause the computing device to follow the payment credential URL to obtain a payment credential for payment for the purchase.

15. The computing device of claim 13 in which the opt-in is received in a first conversation between the user and the chat bot and the purchase gesture is received during a second subsequent conversation between the user and the chat bot.

16. The computing device of claim 13 in which the instructions further cause the computing device to utilize the payment agreement for one or more subsequent purchases by the user from the chat bot provider.

17. The computing device of claim 13 in which the chat bot is configured to converse with the user through a user interface supported on the computing device.

18. The computing device of claim 13 in which the two or more different application services each comprise a different e-commerce website.

* * * * *